(12) United States Patent
Hayashi et al.

(10) Patent No.: US 7,650,611 B2
(45) Date of Patent: Jan. 19, 2010

(54) DISC APPARATUS

(75) Inventors: Ryuuji Hayashi, Daito (JP); Nobuyuki Okazaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 474 days.

(21) Appl. No.: 11/472,470

(22) Filed: Jun. 22, 2006

(65) Prior Publication Data

US 2006/0294532 A1      Dec. 28, 2006

(30) Foreign Application Priority Data

Jun. 23, 2005    (JP) .............................. 2005-182746

(51) Int. Cl.
*G11B 17/047* (2006.01)
*G11B 33/12* (2006.01)

(52) U.S. Cl. ...................... 720/607; 720/613
(58) Field of Classification Search ............ 720/607, 720/613
See application file for complete search history.

(56) References Cited

U.S. PATENT DOCUMENTS 5,621,713 A * 4/1997 Sato et al. ................... 720/607
6,208,606 B1 * 3/2001 Saito .......................... 720/609
6,789,260 B2 * 9/2004 Shiomi ....................... 720/607
7,017,164 B2 * 3/2006 Iwaasa ....................... 720/607
7,240,351 B2 * 7/2007 Sakano ....................... 720/607
2004/0205786 A1 * 10/2004 Kagawa ..................... 720/607

FOREIGN PATENT DOCUMENTS

| JP | 07201116 A | * | 8/1995 |
| JP | 2001283496 A | * | 10/2001 |
| JP | A-2002-288916 | | 10/2002 |
| JP | 2003196910 A | * | 7/2003 |
| JP | A-2004-310804 | | 11/2004 |

* cited by examiner

*Primary Examiner*—William J Klimowicz
(74) *Attorney, Agent, or Firm*—Morgan Lewis & Bockius LLP (57) ABSTRACT

In a disc apparatus, a tray gear has a boss protruding from one predetermined place in an inner circumference edge part thereof. During assembly of a tray into the apparatus cabinet, when the boss is located within a predetermined range of rotation of the tray gear, the boss meshes with a groove-forming rib provided on the tray and is thereby centered so that the tray gear and the rack mesh with each other always at the same teeth thereof.

8 Claims, 7 Drawing Sheets

DISC APPARATUS

This application is based on Japanese Patent Application No. 2005-182746 filed on Jun. 23, 2005, the contents of which are hereby incorporated by reference.

BACKGROUND OF THE INVENTION

1. Field of the Invention

The present invention relates to a disc apparatus that performs recording to or reproduction from a disc such as a CD or a DVD, and more particularly to a structure for assembly of a tray into such a disc apparatus.

2. Description of Related Art

In conventionally known disc apparatuses, a disc is placed on a tray, which is then moved into the apparatus cabinet, and the disc is then clamped between a disc holder (that is, a clamper) and a turntable, of which both are provided inside the apparatus cabinet. This makes the disc ready for recording or reproduction. In recent years, a variety of proposals have been made for better workability in assembly and other work on such disc apparatuses.

For example, JP-A-2004-310804 discloses a disc loading apparatus that can be assembled into an apparatus base by being slid in the transport direction of transporting means and that in addition permits proper adjustment of the meshing position between a gear mechanism including a partially toothless gear and a rack of the transporting means mesh.

Specifically, the disc loading apparatus disclosed in JP-A-2004-310804 is provided with: a tray base for transporting a disc; a drive mechanism for driving the tray base; a rack that is provided on the tray base and that meshes with an output gear of the drive mechanism; a drive gear train that includes the output gear and a partially toothless gear and that forms part of the driving mechanism; a slit wall portion that is provided on the top-face side of the drive gear train and whose orientation coincides with the movement direction of the tray base when the partially toothless gear is in a predetermined rotation position; and a protruding portion that is provided integrally with the tray base and that, as the tray base moves, passes through a slit passage that runs in the above-mentioned orientation.

On the other hand, JP-A-2002-288916 discloses a disc apparatus that prevents the mesh between a rack of a tray and a drive gear from being released during assembly of the tray. Specifically, in the disc apparatus disclosed in JP-A-2002-288916, a clearance portion is provided between teeth of the drive gear, and a large-width portion having a width corresponding to the clearance portion is provided in a guide-in portion of the rack of the tray. Here, during assembly of the tray, the large-width portion of the tray fits in the clearance of the drive gear, in which state the meshing position between a first gear and the rack of the tray coincides with the meshing position between a second gear and a movable base drive portion. This ensures that assembly of the tray is completed in a single step of work.

Disadvantageously, however, with a structure like that of the disc loading apparatus disclosed in JP-A-2004-310804, there is little freedom when the slit wall portion is brought into the orientation coincident with the movement direction of the tray base when the partially toothless gear is in a predetermined rotation position, and moreover a complicated mechanism is needed. On the other hand, with a structure like that of the disc apparatus disclosed in JP-A-2002-288916, it is impossible to cope with cases where a drive gear needs to be brought into a particular meshing position. Conventionally, in a case where a drive gear needs to be brought into a particular meshing position as just mentioned, it is customary to perform assembly of a tray while restricting the orientation of a tray-drive gear with a jig or the like. This is inconvenient and impairs workability.

SUMMARY OF THE INVENTION

In view of conventionally experienced disadvantages as discussed above, it is an object of the present invention to provide a disc apparatus that, despite having a simple structure, permits easy and sure adjustment of the meshing position of a gear for driving a tray during assembly of the tray.

To achieve the above object, according to the present invention, a disc apparatus in which a tray having a disc placed thereon is moved into an apparatus cabinet so as to clamp the disc between a damper and a turntable inside the apparatus cabinet in order to perform recording to and reproduction from the disc and that is provided with a tray gear that meshes with a rack of the tray and drives the tray is characterized in: that a boss is formed so as to protrude from one predetermined place in an inner circumference edge part of the tray gear; and that, during assembly of the tray into the apparatus cabinet, when the boss is located within a predetermined range of rotation of the tray gear, the boss meshes with a groove-forming rib provided on the tray and is thereby centered so that the tray gear and the rack mesh with each other always at the same teeth thereof.

The rib may have a guide-in portion that is open in a taper shape so as to guide the boss in. The rib may have a guide-out portion that is open so as to guide the boss out of the rib when the tray gear in mesh with the rack rotates. The rib may have a stopper portion with which the boss makes contact when, during assembly of the tray into the apparatus cabinet, the boss is located outside the predetermined range of rotation of the tray gear.

Thus, according to the present invention, it is possible to realize a disc apparatus that, despite having a simple structure, permits easy and sure adjustment of the meshing position of a gear for driving a tray during assembly of the tray.

DETAILED DESCRIPTION OF PREFERRED EMBODIMENTS

Figure 1:
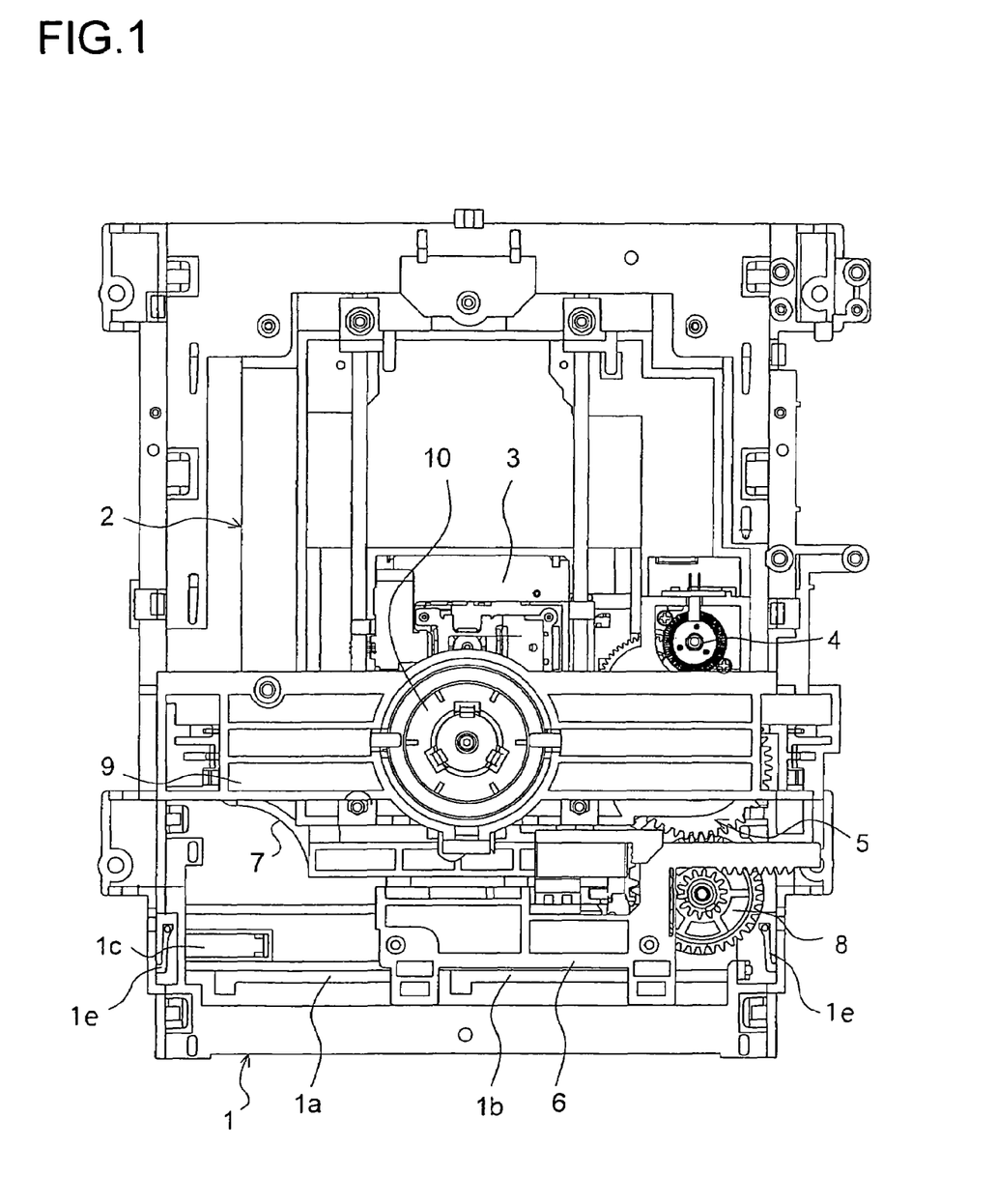
FIG. 1 is a plan view showing the disc loader of a disc apparatus according to the present invention.
Figure 2:
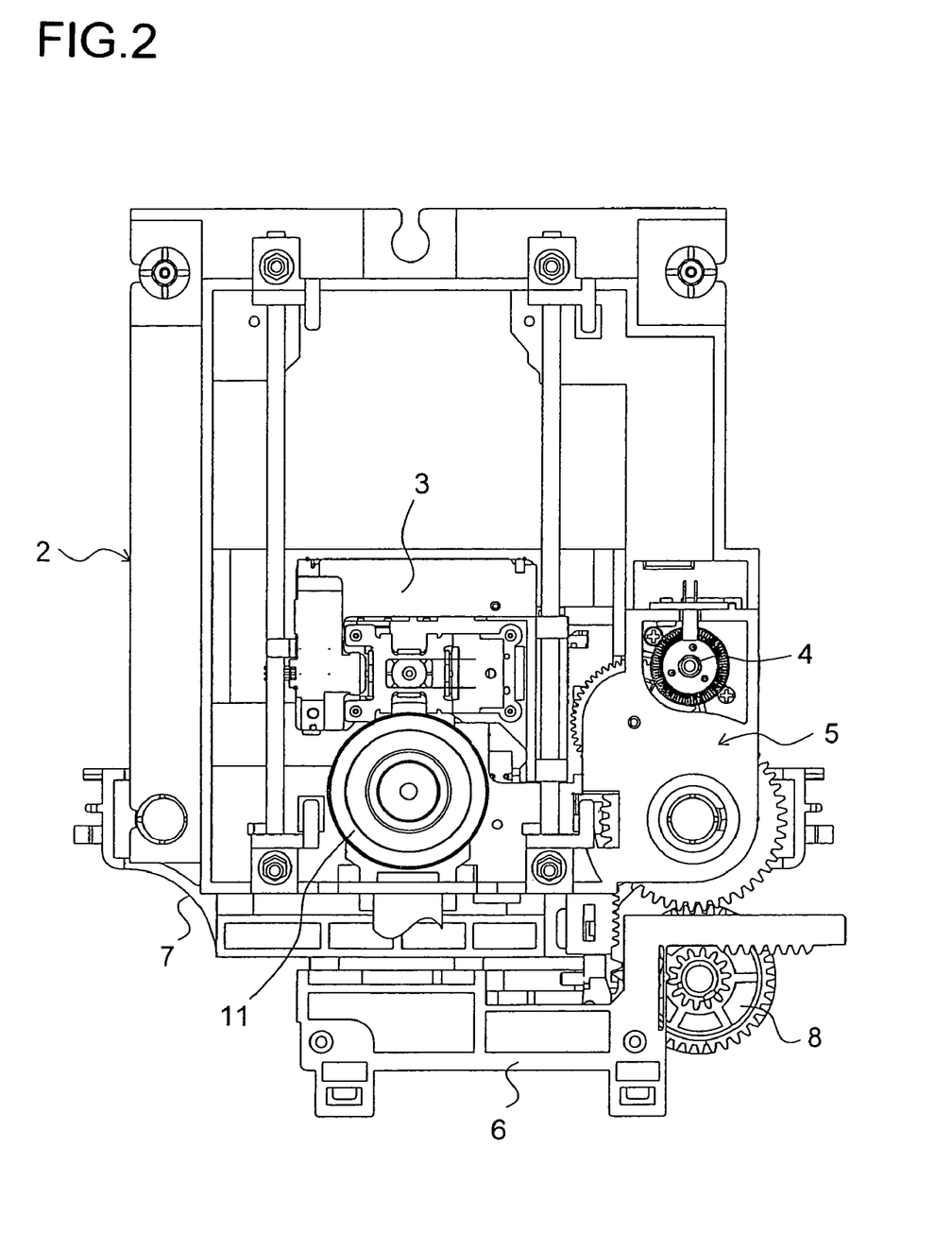
FIG. 2 is a plan view showing, mainly, the traverse mechanism of the disc apparatus.

Hereinafter, an embodiment of the present invention will be described with reference to the accompanying drawings. FIG. 1 is a plan view showing the disc loader of a disc apparatus according to the present invention. FIG. 2 is a plan view showing, mainly, the traverse mechanism of the disc apparatus. This disc apparatus has a loader chassis 1, which is provided with: a tray (unillustrated) for transporting a disc; and a traverse mechanism 2 that can move up and down by rotating in a direction substantially perpendicular to the transport direction (front-rear direction) of the tray. The loader chassis 1 is fixed to an unillustrated apparatus cabinet.

The traverse mechanism 2 is provided with: a pickup unit 3 having an optical pickup for recording to or reproducing from a disc; and a motor 4 for moving the pickup unit 3 in a radial direction of the disc. The motor 4 is fitted with transmitting means 5 realized with a plurality of flat gears. The transmitting means 5 transmits the driving force of the motor 4 while reducing the speed of rotation. The transmitting means 5 meshes with a rack (unillustrated) formed on the pickup unit 3, and thereby permits the motor 4 to move the pickup unit 3.

The transmitting means 5 meshes with a tray gear 8 provided in front, and the tray gear 8 can mesh with a cam slider 6 arranged, on the part of the loader chassis 1, in front of the traverse mechanism 2. The cam slider 6 cam-engages with a shift lever 7 provided in a front part of the traverse mechanism 2, and can move in a direction (left-right direction) substantially perpendicular to the transport direction (front-rear direction) of the tray and to the direction in which the traverse mechanism 2 moves up and down. This permits the traverse mechanism 2 to move up and down. The tray gear 8 can also mesh with a rack formed on the tray so that, with predetermined timing, the tray gear 8 and the tray couple to each other to permit the driving force of the motor 4 to be transmitted to the tray.

In the disc apparatus structured as described above, when a disc is placed on the tray, the tray is transported into the disc loader by being driven by the motor 4. When the tray reaches a predetermined position, the tray and the tray gear 8 decouple from each other, and now the cam slider 6 and the tray gear 8 couple to each other. The cam slider 6 moves in a direction (left-right direction) perpendicular to the transport direction of the tray, and thereby moves the traverse mechanism 2 up. Thus, the traverse mechanism 2 engages with and thereby clamps the disc.

Here, the clamping of the disc is achieved in the following manner. Across the top face of the loader chassis 1, an elongate plate-shaped clamp holder 9 is laid to run in the left-right direction. In the middle of the clamp holder 9, a substantially disc-shaped damper 10 is rotatably provided. On the other hand, a turntable 11 that is driven to rotate by an unillustrated spindle motor is provided on the traverse mechanism 2 to protrude upward therefrom. When the disc is clamped as mentioned above, the traverse mechanism 2 moves up so that the center hole of the disc engages with the turntable 11, and then the traverse mechanism 2 moves further up so that the disc is clamped between the turntable 11 and the damper 10.

When the disc is clamped, the tray gear 8 and the cam slider 6 decouple from each other, and now the transmitting means 5 and the pickup unit 3 couple to each other. This permits the pickup unit 3 to move in a radial direction of the disc, making the disc ready for recording or reproduction at desired places thereon. When the disc is taken out, the procedure described above is performed in the reverse order. Below will be described the structure for assembly of the tray into the disc apparatus according to the present invention.

Figure 3:
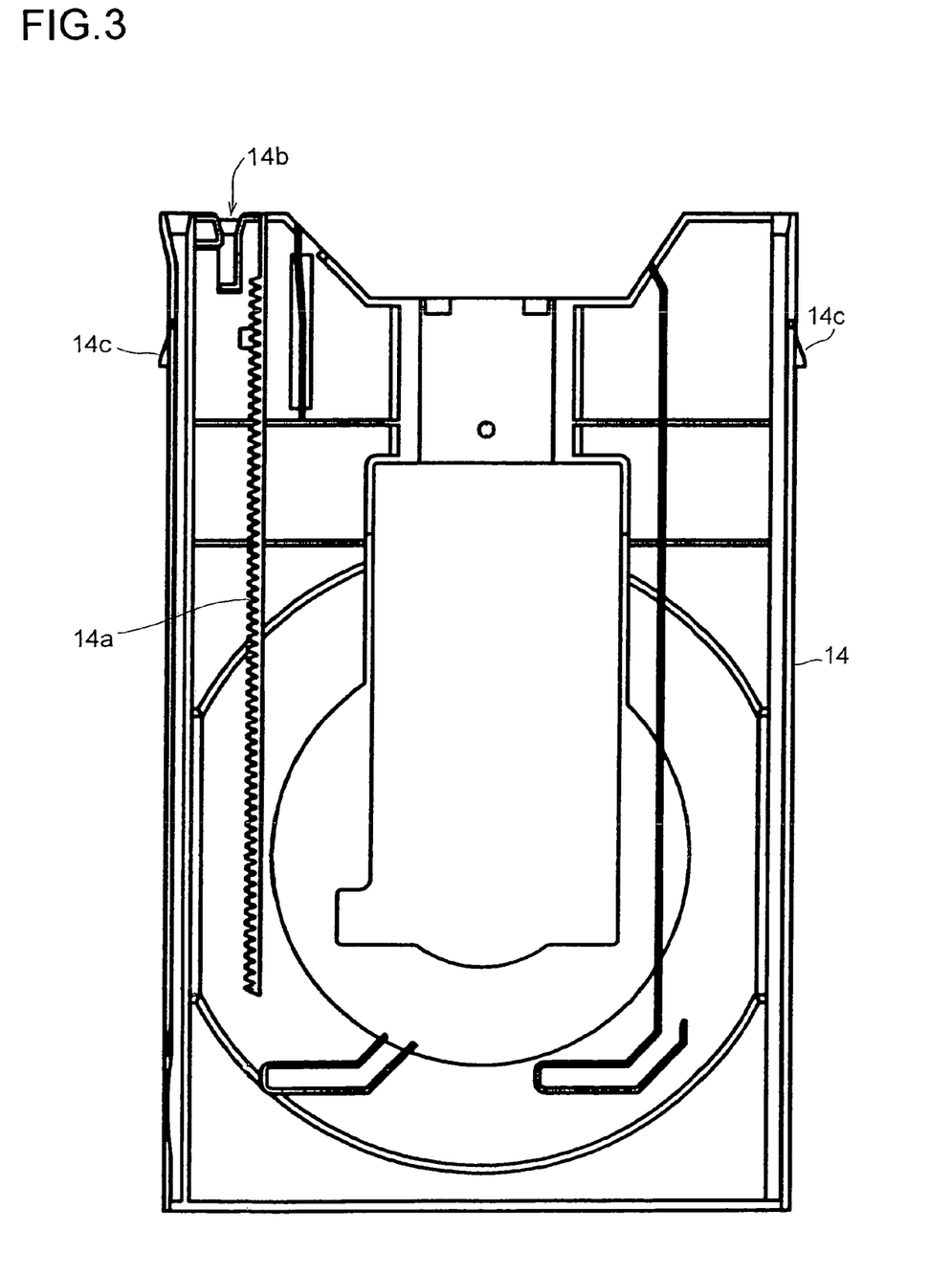
FIG. 3 is a bottom view of the tray of the disc apparatus.

FIG. 3 is a bottom view of the tray. As shown in the figure, this tray 14 has a rack portion 14a extending from rear to front in a right-hand (in the figure, left-hand) part of the bottom face thereof. The rack portion 14a meshes with the tray gear 8. Near the rear end of the rack portion 14a, a rib 14b is provided that engages with a boss provided, as will be described later, on the tray gear 8. On the right-hand and left-hand side faces of the tray 14, in rear parts thereof, protrusions 14c are provided that serve as a stopper by engaging with hooks provided, as will be described later, on the loader chassis 1.

Figure 4:
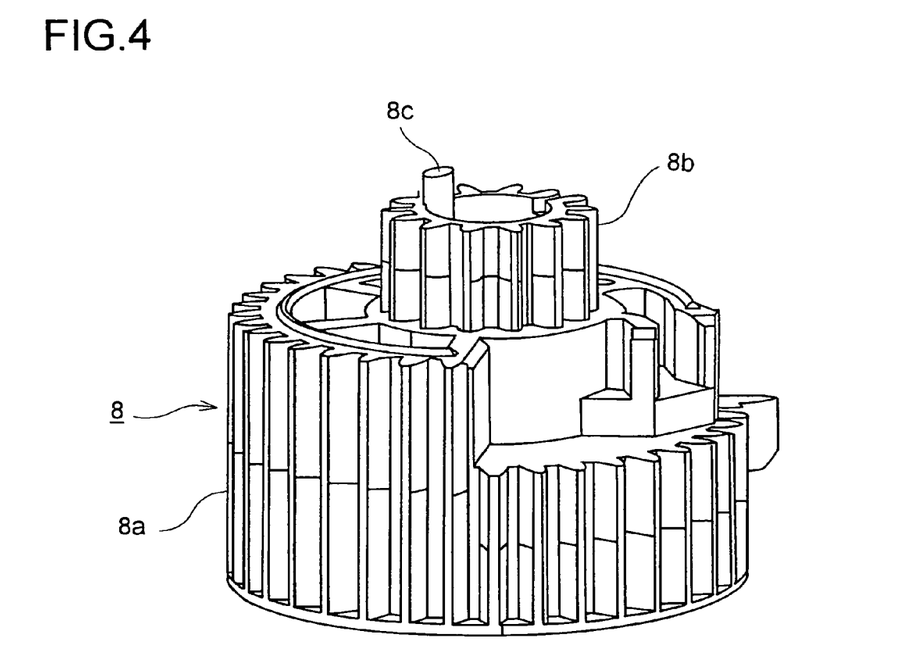
FIG. 4 is an upper perspective view of the tray gear of the disc apparatus.

FIG. 4 is an upper perspective view of the tray gear. As shown in the figure, the tray gear 8 is roughly divided into: a larger-diameter gear portion 8a that meshes with the transmitting means 5; and a smaller-diameter gear portion 8b that is arranged above the larger-diameter gear portion 8a concentrically therewith and that meshes with the cam slider 6 and with the rack portion 14a of the tray 14. Moreover, in an inner circumference edge part of the smaller-diameter gear portion 8b, at one predetermined place thereon, a boss 8c is provided that protrudes therefrom upward along the rotation axis. The boss 8c engages with the rib 14b of the tray 14, and thereby guides the smaller-diameter gear portion 8b and the rack portion 14a so that they mesh with each other always at the same teeth thereof. Incidentally, as shown in FIG. 4, the inner circumference edge part of the smaller-diameter gear portion 8b includes a thick-walled part of the gear of the smaller-diameter gear portion 8b. The boss 8c may be so arranged as to bulge toward the rotation axis while being contiguous with the inner circumference edge part of the smaller-diameter gear portion 8b, or may be so arranged to be located on the inner circumference edge part of the smaller-diameter gear portion 8b. The boss 8c may be so arranged that part thereof bulges toward the rotation axis from the inner circumference edge part of the smaller-diameter gear portion 8b while the rest is located on the inner circumference edge part of the smaller-diameter gear portion 8b.

Figure 5:
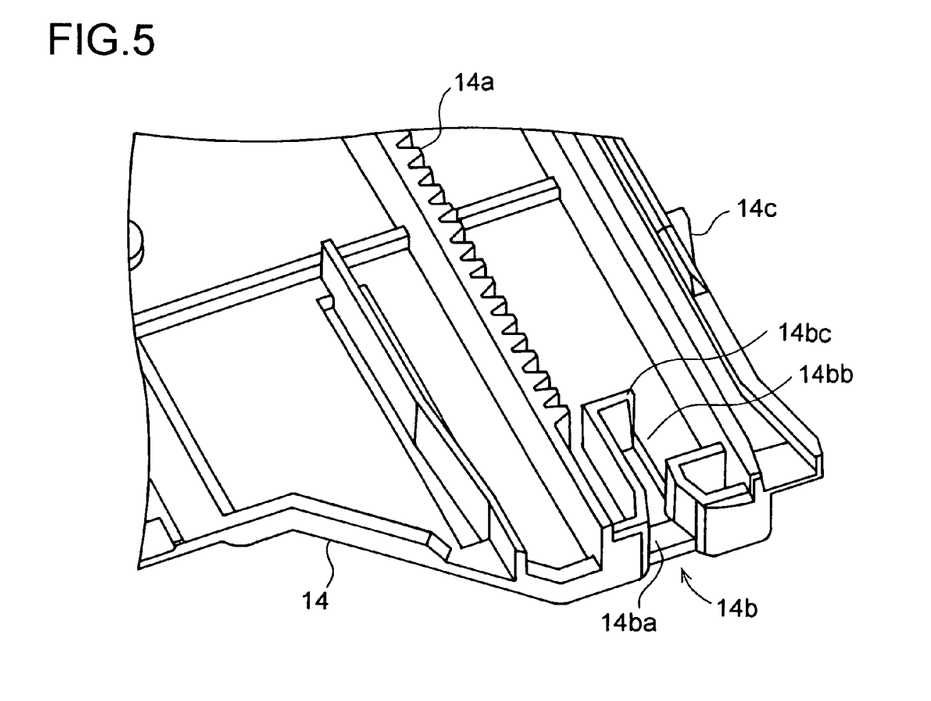
FIG. 5 is a lower perspective view of and around the rib provided in a rear part of the tray.

FIG. 5 is a lower perspective view of and around the rib provided in a rear part of the tray. The rib 14b is so shaped as to form a groove extending from the rear end of the tray 14 frontward to near the rear end of the rack portion 14a. The rib 14b has: a guide-in portion 14ba that is open in a taper shape at the rear end of the rib 14b; and a guide-out portion 14bb that is open in the side face of the rib 14b facing away from the rack portion 14a. The rib 14b is closed at the front end thereof to form a stopper portion 14bc with which the boss 8c makes contact when they are in a predetermined positional relationship as will be described later.

Figure 6:
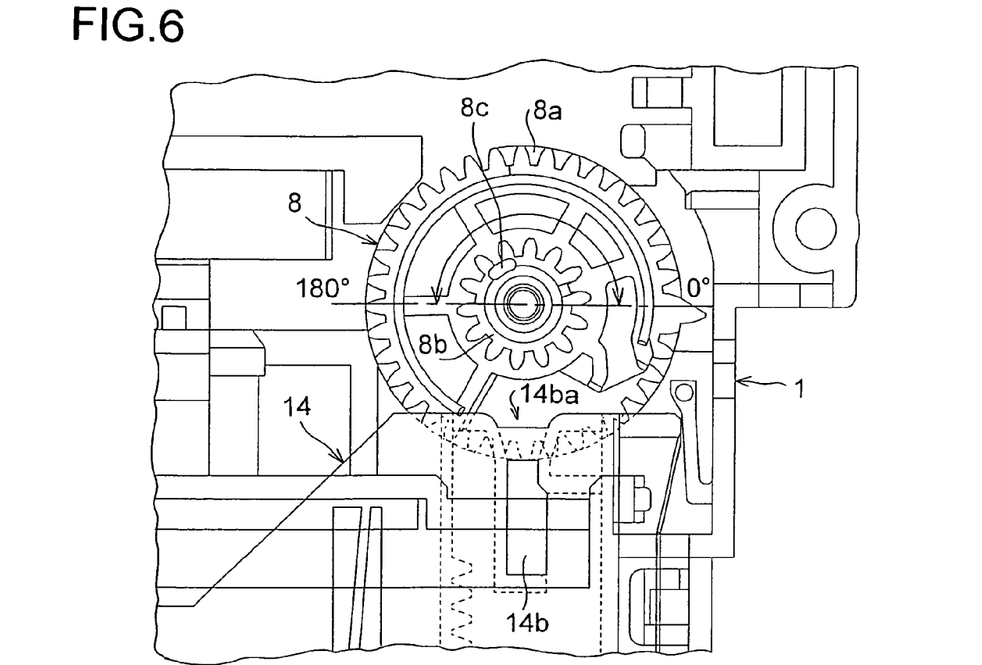
FIG. 6 is a diagram showing a positional relationship between the tray and the tray gear during assembly of the tray.

Below will be described the procedure for assembly of the tray in this embodiment. FIGS. 6 to 10 are diagrams showing varying positional relationships between the tray and the tray gear during assembly of the tray. These figures are each a plan view showing the tray gear as seen through the tray. First, as shown in FIG. 6, the tray gear 8 is so oriented that the boss 8c is located behind the center of the tray gear 8, within the range of rotation from 0 degrees to 180 degrees relative to the exactly rightward direction as indicated by arrows.

Figure 7:
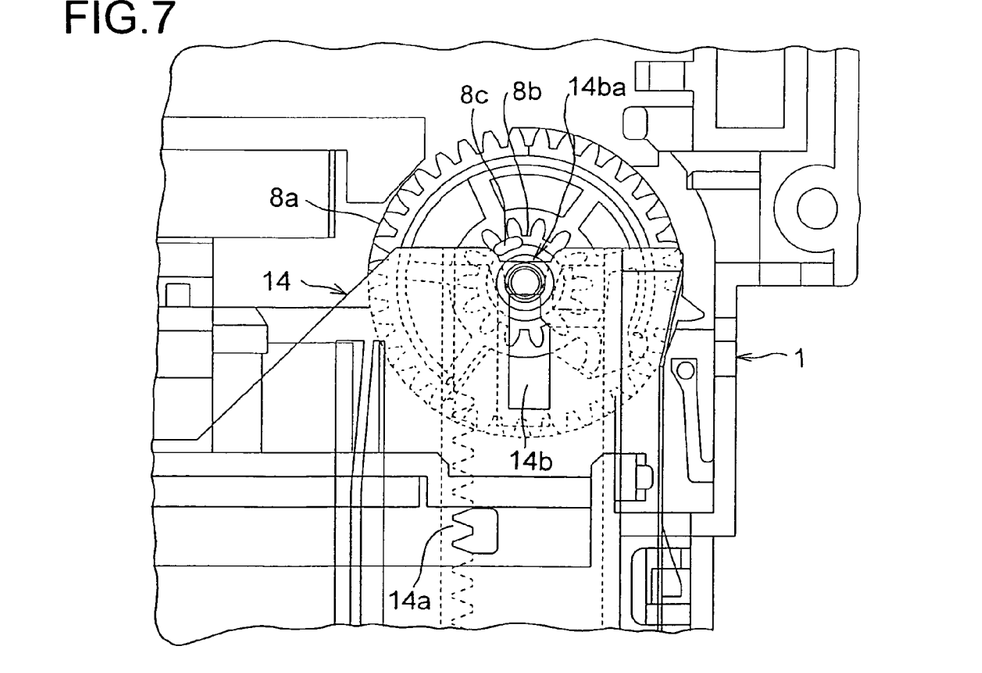
FIG. 7 is a diagram showing a positional relationship between the tray and the tray gear during assembly of the tray.
Figure 8:
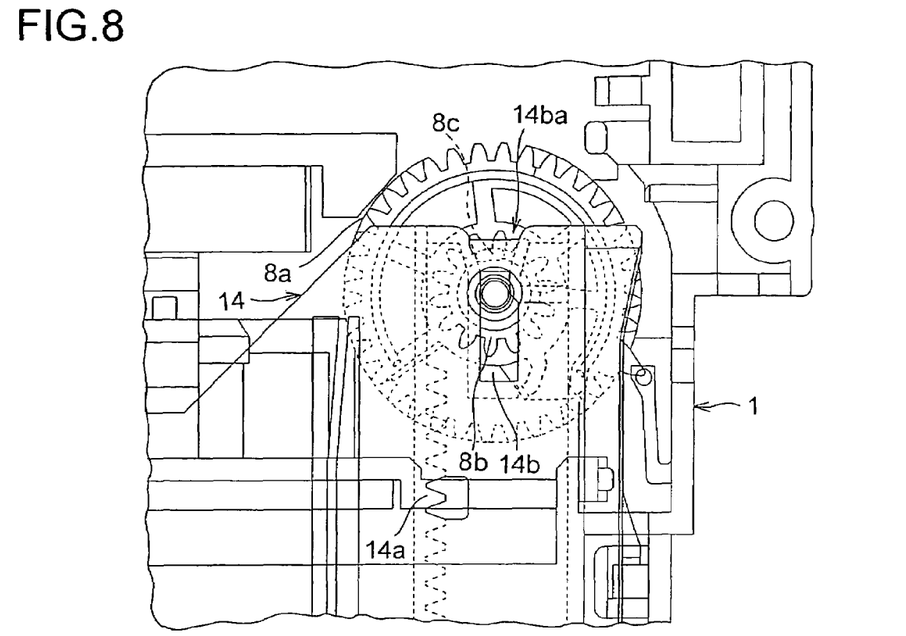
FIG. 8 is a diagram showing a positional relationship between the tray and the tray gear during assembly of the tray.

In this state, as shown in FIG. 7, as the tray 14 is moved into the loader chassis 1, the rear end of the rib 14b pushes the boss 8c and thereby rotates the tray gear 8 until the boss 8c fits into the guide-in portion 14ba of the rib 14b. Here, needless to say, depending on the initial location of the boss 8c, it may immediately fits into the guide-in portion 14ba. As the tray 14 is pushed further into the loader chassis 1, as shown in FIG. 8, along the taper shape of the guide-in portion 14ba, the boss 8c is gradually centered.

Figure 9:
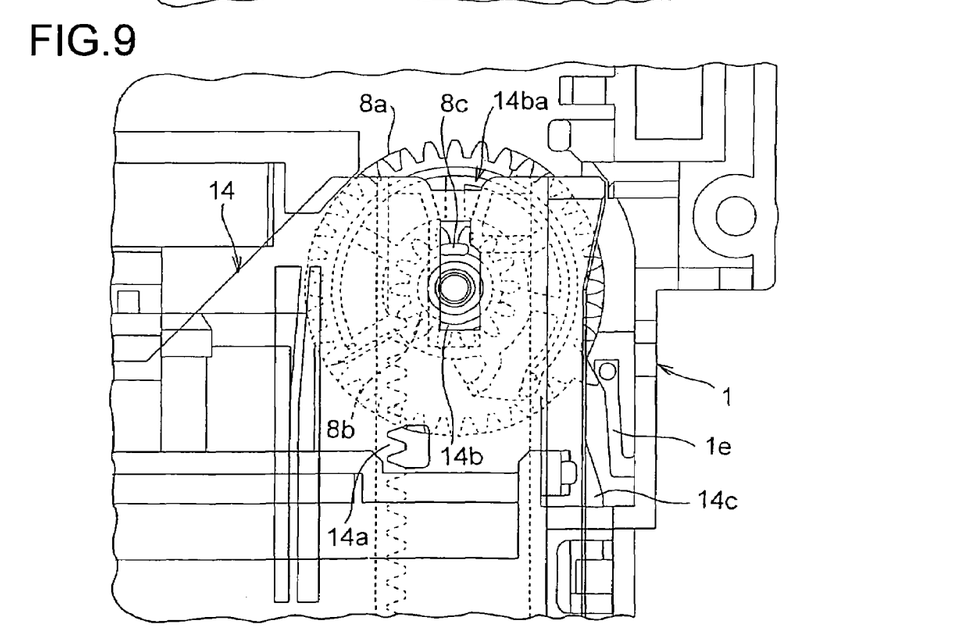
FIG. 9 is a diagram showing a positional relationship between the tray and the tray gear during assembly of the tray.

As the tray 14 is pushed further in, as shown in FIG. 9, the boss 8c reaches deep inside the rib 14b and is thus completely centered. At this point, the tooth at the rear end of the rack portion 14a of the tray 14 meshes always with the same tooth on the smaller-diameter gear portion 8b of the tray gear 8. As the tray 14 is pushed further in, the mesh between the rack portion 14a and the smaller-diameter gear portion 8b makes the tray gear 8 rotate clockwise, causing the boss 8c to move out of the rib 14b through the guide-out portion 14bb. Explained again with reference to FIG. 5, the mesh between the rack portion 14a and the smaller-diameter gear portion 8b makes the tray gear 8, and hence the boss 8c together therewith, rotate clockwise, permitting the boss 8c to move out of the rib 14b through the guide-out portion 14bb without making contact with the stopper portion 14bc.

Figure 10:
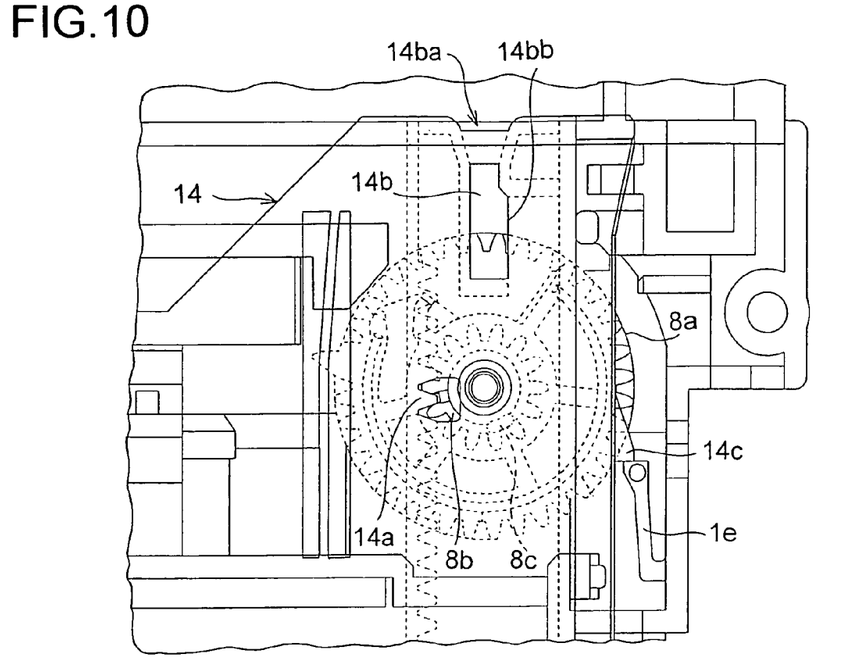
FIG. 10 is a diagram showing a positional relationship between the tray and the tray gear during assembly of the tray.

Lastly, as shown in FIG. 10, the tray 14 is pushed further in until the protrusions 14c provided in rear parts of the left-hand and right-hand side faces of the tray 14 move beyond hooks 1e provided at the left-hand and right-hand sides of an entrance part of the loader chassis 1. Now the tray 14 has been assembled into the loader chassis 1. Structured as described above, the disc apparatus according to the present invention permits easy and sure adjustment of the meshing position between the rack portion 14a of the tray 14 and the smaller-diameter gear portion 8b of the tray gear 8.

Figure 11:
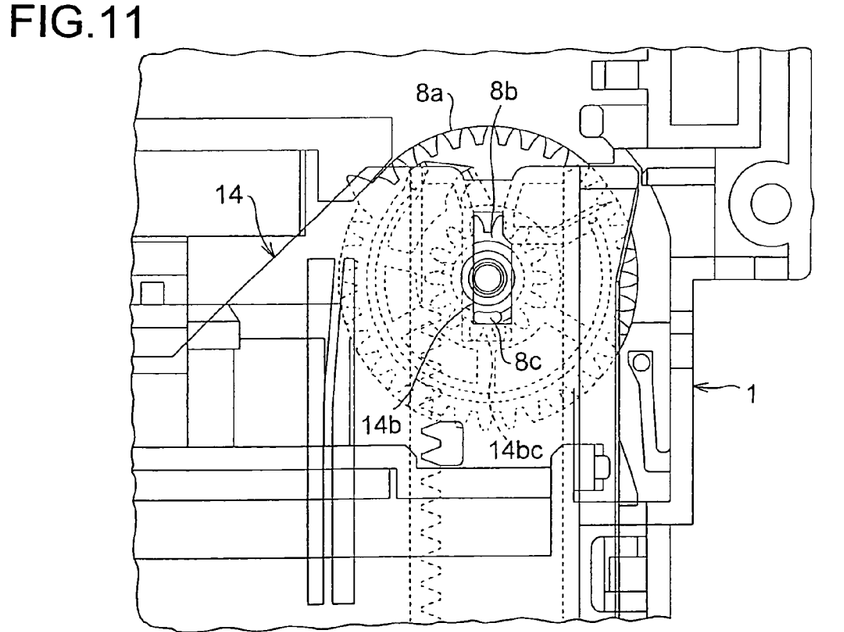
FIG. 11 is a diagram showing what happens when the tray gear is improperly oriented.

If the tray gear 8 is improperly oriented, the boss 8c is located in front of the center of the tray gear 8, within the range of rotation from 180 degrees to 360 degrees relative to the exactly rightward direction (that is, out of the previously mentioned range of rotation). In this case, the disc apparatus according to the present invention does not permit assembly of the tray 14. Specifically, in this case, as shown in FIG. 11, before the rack portion 14a of the tray 14 and the smaller-diameter gear portion 8b of the tray gear 8 meshes with each other, the boss 8c that has fitted into the rib 14b makes contact with the stopper portion 14bc. This prevents the tray 14 from being pushed further into the loader chassis 1.

As described above, according to the present invention, thanks to the provision of a mechanism that, so long as a gear component that requires adjustment of its meshing position is properly oriented, permits assembly of a tray without confirmation of the mesh of that gear component, there is no need to confirm the mesh between small gears during assembly of the tray, and it is thus possible to improve workability.

What is claimed is:

1. A disc apparatus comprising:
a tray that has a rack and on which a disc is placed; and
a tray gear that meshes with the rack and that drives the tray, wherein
the tray has a groove-forming rib in a rear-end part thereof,
the tray gear has a boss protruding from one predetermine place thereon different from where a rotation axis of the tray gear is positioned,
the rib has a position adjusting portion having substantially a same width as the boss, and
when the boss is located at a front end of the position adjusting portion, teeth of the tray gear make contact with teeth of the rack.

2. The disc apparatus of claim 1, wherein
the rib has a guide-in portion that is open in a taper shape, gradually widening backward from the position adjusting portion.

3. The disc apparatus of claim 1, wherein
the rib has a guide-out portion that is open so as to guide the boss out of the rib when the boss is located at the front end of the position adjusting portion and the tray gear making contact with the rack rotates.

4. The disc apparatus of claim 1, wherein
the rib has a stopper portion with which the boss makes contact when the boss, being located in front of the rotation axis of the tray gear and at the front end of the position adjusting portion, moves further forward.

5. The disc apparatus of claim 2, wherein
the rib has a guide-out portion that is open so as to guide the boss out of the rib when the boss is located at the front end of the position adjusting portion and the tray gear making contact with the rack rotates.

6. The disc apparatus of claim 2, wherein
the rib has a stopper portion with which the boss makes contact when the boss, being located in front of the rotation axis of the tray gear and at the front end of the position adjusting portion, moves further forward.

7. The disc apparatus of claim 3, wherein
the rib has a stopper portion with which the boss makes contact when the boss, being located in front of the rotation axis of the tray gear and at the front end of the position adjusting portion, moves further forward.

8. The disc apparatus of claim 5, wherein
the rib has a stopper portion with which the boss makes contact when the boss, being located in front of the rotation axis of the tray gear and at the front end of the position adjusting portion, moves further forward.

* * * * *